United States Patent [19]

Weldin

[11] 4,333,568
[45] Jun. 8, 1982

[54] CASSETTE TAPE DUST COVER

[75] Inventor: Karl D. Weldin, Wilmington, Del.

[73] Assignee: Jerre E. Epps, Philadelphia, Pa.; a part interest

[21] Appl. No.: 166,760

[22] Filed: Jul. 7, 1980

Related U.S. Application Data

[63] Continuation-in-part of Ser. No. 955,593, Oct. 30, 1978, abandoned.

[51] Int. Cl.³ .................... B65D 85/67; B65D 45/00; B65D 59/06
[52] U.S. Cl. ................................ 206/387; 206/806; 206/459; 211/113
[58] Field of Search ................ 206/387, 806, 459; 211/113

[56] References Cited

U.S. PATENT DOCUMENTS

| | | |
|---|---|---|
| 3,310,178 | 3/1967 | Wright . |
| 3,593,845 | 7/1971 | Schwartz . |
| 3,599,786 | 8/1971 | Osojnak ............................ 206/387 |
| 3,696,935 | 10/1972 | Dean . |
| 3,746,180 | 7/1973 | Spiroch et al. . |
| 3,747,745 | 7/1973 | Esashi et al. . |
| 3,770,120 | 11/1973 | Hanson . |
| 3,994,550 | 11/1976 | Ackeret ............................ 206/387 |
| 3,994,551 | 11/1976 | Ackeret . |
| 4,067,629 | 1/1978 | Amatsu et al. . |
| 4,087,145 | 5/1978 | Weavers . |
| 4,119,200 | 10/1978 | Cassidy et al. ..................... 206/387 |
| 4,248,345 | 2/1981 | Bowers ............................ 206/387 |

Primary Examiner—William T. Dixson, Jr.
Attorney, Agent, or Firm—Beveridge, Degrandi & Kline

[57] ABSTRACT

A case for tape cassettes comprising a holder for the cassette being in the form of a U-shaped container with enclosed ends which conforms to the configuration of the open side of a cassette and receives the cassette there between, and a flexible strap extending from one side of the U-shaped container and having two cams adapted to tightly fit into the spindle of the reels whereby the U-shaped container is held in place and the reels are prevented from rotating.

5 Claims, 5 Drawing Figures

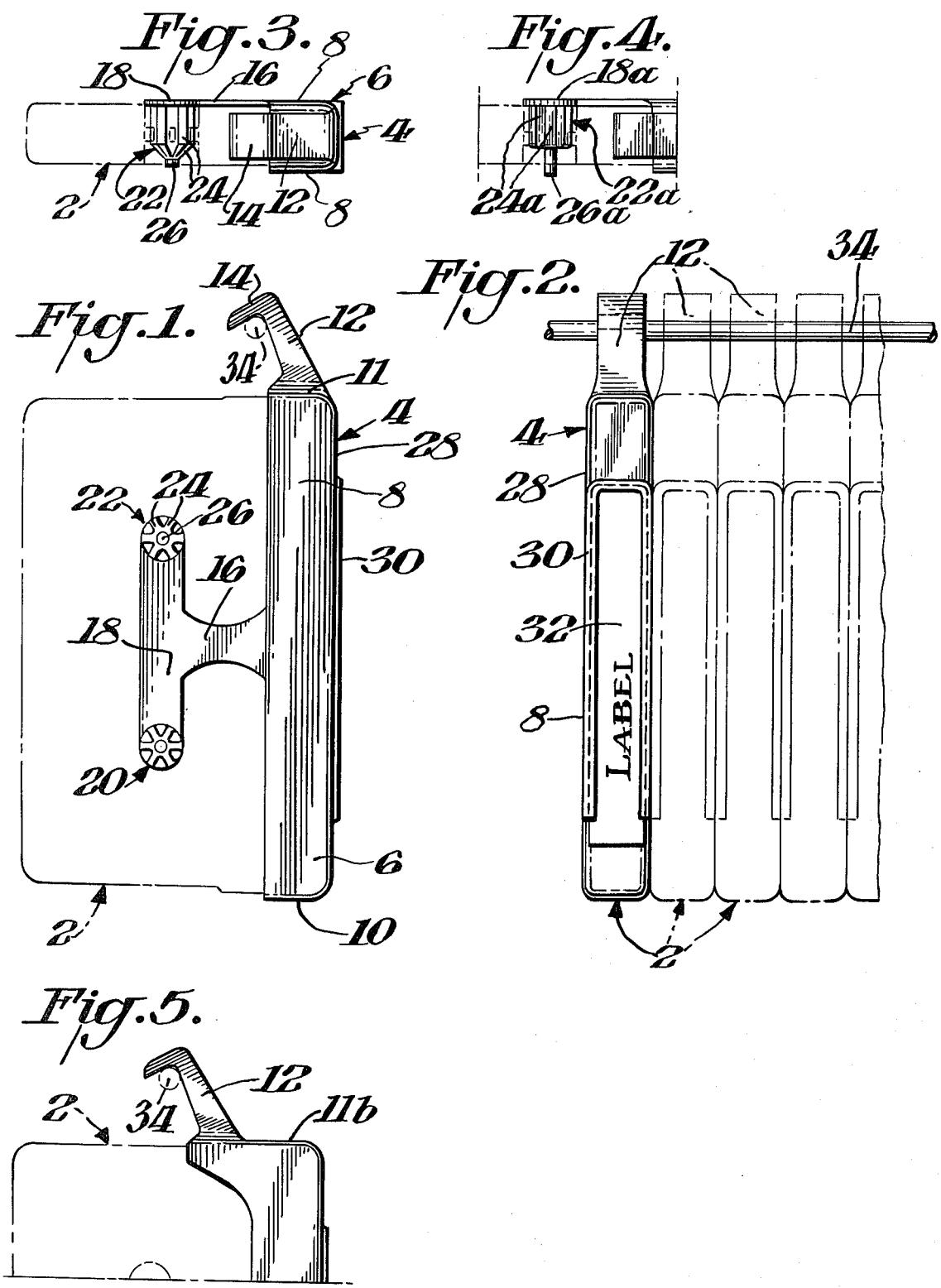

CASSETTE TAPE DUST COVER

CROSS-REFERENCE TO RELATED APPLICATION

This is a continuation-in-part of my prior patent application, Ser. No. 955,593 filed Oct. 30, 1978, now abandoned.

BACKGROUND OF THE INVENTION

1. Field of the Invention

This invention relates to cases for tape cassettes and in particular to a device for enclosing the head of a tape cassette to prevent dust and other artificial materials from coming in contact with the tape. The invention also embodies a means for preventing the reels from unwinding and storing the cassettes on a rack or case.

2. Description of the Prior Art

Tape cassettes as commonly used today are a case containing two reels holding magnetic tape. The case is closed on all sides except for an opening at one side which permits access to magnetic recording and playback heads. Usually the cassette housing has ventilation openings on both sides of the cassette housing in the region where the playback head and recording head meet the tape. Each cassette has two reels and these reels are rotated by drive shafts which engage protrusions on the spindle of the reel. The openings in the recording and playback head allow dust to enter and dust can affect the quality of recordings on the magnetic tape.

U.S. Pat. No. 3,310,178 to Wright and U.S. Pat. No. 3,696,935 to Dean both involve very similar devices used on regular magnetic tape reels. Both involve a flexible band which is placed around the circumference of the reel and engages both rims of the circular plates which form the sides of these reels. A locking device holds the flexible band in place on the reel. Both patents describe a hook attached to the flexible band which is used to hold the reels on a horizontal rod or similar structure. Both of these devices provide a means of protecting the tape from exposure to dust and also for easy storage of the device. However, neither of these devices is suitable for use with a tape cassette.

Devices for the storage of cassettes are also known. U.S. Pat. No. 3,746,180 to Spiroch et. al. discloses a plastic cover which engages the raised portions along the side of the playback or recording opening of a tape cassette. This cover extends beyond the ends of the cassette and the ends which extend beyond the cassette side are placed on the rim of a storage box. The cover also carries a label which identifies the contents of the cassette. This device does not prevent the reels from unrolling and requires specially designed boxes for storage of the cassettes.

U.S. Pat. No. 3,747,745 to Esashi et. al. describes a cassette cover involving a plate which covers the opening which receives the recording and playback heads. Two side members are attached to this plate by hinges and swing down to enclose the side of the cassette. The two folding members are cut out in the region around the playback head so that they hit flush with the cassette cover but do not cover the raised portion near the playback head openings. The hinged members are kept closed by fastening means which fit through the openings of the reels of the cassette where the cassette engages the drive mechanism of a cassette player or recorder. The state objective for this invention was to provide a means for flat stacking the cassettes without adding to the amount of space presented by the raised portion around the playback and recording head area. This device will not cover the openings on the side of the cassette that covers the playback and recording location and dust and other impurities can pass into the cassette and affect the quality of the recordings.

Two patents on cassette covers have issued to Ackeret; U.S. Pat. No. 3,994,550 and U.S. Pat. No. 3,994,551. U.S. Pat. No. 3,994,551 describes a cover which engages the raised open end of housing and had two cams which fit into the teeth of reels of the cassette and prevent the reels from unrolling. U.S. Pat. No. 3,994,551 describes a housing which encloses the entire cassette and has a spring in the bottom of the cassette for holding the cassette in position. A cam engaging the teeth of the cassette reels is used to prevent the reels from unwinding.

SUMMARY OF THE INVENTION

The invention comprises a U-shaped device which encloses the open side of a tape cassette. The open side of the tape cassette is the side which receives the recording or playback head of a tape recorder. The configuration of the cassette cover is such that it encloses the entire length of the open side of the tape cassette and between one-fourth to one-third of the width. A hanger at one end of the cover terminates in a hook which is used to hang the tape cassette in a storage chamber suitably adapted to receive a large number of cassettes. The cover is held in place by a strap which is attached to the middle of the U-shaped case on one end and the other end terminates in spindle pegs which are forced into the reel opening on the tape cassettes. The length of the strap is such that it fits tightly to the side of the tape cassette when the spindle peg is forced into the reels.

More particularly the invention comprises a storage case for a recording tape cassette comprising:

(a) a holder for the cassette being in the form of a U-shaped container with enclosed ends which conforms to the configuration of the open side of a cassette and receives the cassette therebetween, (b) a flexible strap extending from one side of the U-shaped container and having two spindle pegs adapted to tightly fit into the spindle of the reels whereby the reels are prevented from rotating, and (c) said U-shaped container has a hook-shaped appendage at one end for hanging the cassette for storage on a horizontal rod.

BRIEF DESCRIPTION OF THE DRAWINGS

FIG. 1 is a side elevational view of the cassette storage cover;

FIG. 2 is an end elevational view of the embodiment shown in FIG. 2;

FIG. 3 is a top plan view of the embodiment shown in FIGS. 1 and 2 also showing details of the spindle rod;

FIG. 4 is a fragmental top end view illustrating a modified spindle; and

FIG. 5 is a fragmental side elevational view illustrating a modified mounting hook from the cassette storage cover.

DETAILED DESCRIPTION OF THE INVENTION

FIG. 1 shows a cassette 2 in outline with the cassette storage cover 4 in position. The main body of the cassette storage cover 4 is a U-shaped case 6 having flat sides 8. One end 10 and another end 11 carry a hanger 12. The cover 4 encloses the opened or recording and playback end of the cassette 2. The hanger 12 has an end which is curved into a hook 14. On one side of the case 6 near the middle and attached to the side panel 8 is a flexible strap 16 which extends partway down the side of the cassette 2. The strap 16 terminates in a T-shaped strap 18 disposed at right angles to the strap 16. The strap 18 has two spindle pegs 20 and 22 at its ends. The spindle pegs 20 and 22 are elongated beyond the plane of the straps 16 and 18 and are spaced so as to fit into the reels of cassette 2. The spindle pegs 20 and 22 in one embodiment also shown in FIG. 3 are formed of separated ribs 24 which terminate in a post 26. The post 26 is also the means for forcing the ribs 24 out of engagement with the cassette reel. The spaces between the separated ribs 24 provide a groove to engage the teeth on the reels of a cassette so that the separated ribs 24 exactly correspond to the spaces between the teeth in the reels of the cassette 2. Ribs 24 and 24a engage sprocket teeth of cassette reels as shown in FIG. 3 and FIG. 4. The fit of the spindle peg is slightly larger than the cassette reel opening so that the compression of the spindle peg when it is forced into the reel teeth maintains the spindle peg in the cassette 2. The length of the strap 16 is such that the strap is flat and tight against the side of the cassette 2. The case 6 has a top surface 28 which has a receptical 30 for labels 32. FIG. 2 shows how the cassette holder can be used to store cassettes by means of the hanger 12.

In FIG. 4, another modification is shown in which the spindle peg 22a is a solid piece having an elongated point 26a and ribs 24a. FIG. 5 shows another modification in which the end 11b has been extended so that the hanger 12a is deflected to a different position on the cassette 2.

The straps 16 and 18 can be made of any flexible material such as leather, flexible plastic, or even a semi-rigid plastic material is suitable. The case 6 is preferably made of a more rigid material such as wood, plastic or metal. Preferably all plastic components would be made by injection molding. The spindle pegs can be hollow as in 20 or solid as in 22a and can be fixed to the strap 18 by any suitable means such as gluing, riveting and the like. The strap 16 can be fixed to the case 6 and in particular, to the side 8 by gluing, stapling, riveting or any other fastening means. The thickness of the side panel 8 can vary to correspond to mate with the cassette. The hook 14 is used to engage a stringer 34 which may be located in a box storage cabinet or the like.

It is readily understood that various modifications of individual features and construction can be made without departing from the spirit and scope of the invention as defined in the claims.

I claim:

1. A storage case for a recording tape cassette for locking the spindles of the cassette reels against rotation and for protecting an open side of the cassette, said storage case comprising:
    a casing member having a base wall, two flat, substantially parallel side walls which form a U-shaped member with said base wall, and a pair of end walls substantially perpendicular to said side walls and enclosing said U-shaped member, said side walls and said end walls having substantially equal width to define an opening opposed to said base wall and adapted for receiving the open side of the cassette;
    a flexible strap extending from one side of said U-shaped member and having two spindle pegs mounted thereon, said pegs adapted to fit into the spindles of the cassette reels to prevent the reels from rotating; and
    a hook-shaped member mounted on one of said end walls for hanging the case, with a cassette therein, on a horizontal rod.

2. A storage case as claimed in claim 1 wherein said hook-shaped member is oriented and located on said end wall so that said case, with cassette therein, hangs substantially vertically when hung on a horizontal rod.

3. A storage case as claimed in claim 1 wherein said base wall includes means for receiving and displaying a label.

4. A storage case as claimed in claim 1 wherein said spindle pegs are adapted for a compression fit in the spindles of the cassette reels to maintain said pegs in the spindles.

5. A storage case as claimed in claim 4 wherein said spindle pegs are plastic and terminate in a point.

* * * * *